(12) United States Patent
Wetzig et al.

(10) Patent No.: US 7,980,117 B2
(45) Date of Patent: Jul. 19, 2011

(54) SNIFFER LEAK DETECTOR COMPRISING A DETECTOR WITH A QUARTZ WINDOW

(75) Inventors: Daniel Wetzig, Cologne (DE); Werner Grosse Bley, Bonn (DE); Peter Lang, Bonn (DE); Stefan Mebus, Cologne (DE)

(73) Assignee: Inficon GmbH (DE)

( * ) Notice: Subject to any disclaimer, the term of this patent is extended or adjusted under 35 U.S.C. 154(b) by 569 days.

(21) Appl. No.: 11/920,089

(22) PCT Filed: Apr. 27, 2006

(86) PCT No.: PCT/EP2006/061875
§ 371 (c)(1),
(2), (4) Date: Oct. 27, 2008

(87) PCT Pub. No.: WO2006/120122
PCT Pub. Date: Nov. 16, 2006

(65) Prior Publication Data
US 2009/0193876 A1    Aug. 6, 2009

(30) Foreign Application Priority Data

May 12, 2005 (DE) .......................... 10 2005 021 909

(51) Int. Cl.
*G01M 3/04* (2006.01)
(52) U.S. Cl. ........................................ 73/40.7
(58) Field of Classification Search .................. None
See application file for complete search history.

(56) References Cited

U.S. PATENT DOCUMENTS

| | | | | |
|---|---|---|---|---|
| 3,939,695 | A | * | 2/1976 | Booth ............................ 73/40.7 |
| 4,419,882 | A | * | 12/1983 | Ishii et al. ...................... 73/40.7 |
| 5,786,529 | A | | 7/1998 | Voss et al. ...................... 73/40.7 |
| 6,119,507 | A | * | 9/2000 | Flosbach et al. ............... 73/40.7 |
| 6,277,177 | B1 | | 8/2001 | Bley et al. .......................... 96/4 |
| 2006/0156795 | A1 | * | 7/2006 | Perkins et al. ................. 73/40.7 |

FOREIGN PATENT DOCUMENTS

DE    10031882    1/2002

OTHER PUBLICATIONS

International Search Report dated Jul. 14, 2006 based on PCT application No. PCT/EP2006/061875.

\* cited by examiner

*Primary Examiner* — Hezron Williams
*Assistant Examiner* — Alex Devito
(74) *Attorney, Agent, or Firm* — Ohlandt, Greeley, Ruggiero & Perle, LLP

(57) ABSTRACT

A sniffer leak detector comprising a detector with a quartz window, the window being selectively permeable to a tracer gas. The quartz window is located in a suction chamber that is connected to a vacuum pump. To reduce the response time, a gas guidance plate is situated in the suction chamber, the guidance plate and quartz window together delimiting a narrow gas guidance chamber.

16 Claims, 1 Drawing Sheet

SNIFFER LEAK DETECTOR COMPRISING A DETECTOR WITH A QUARTZ WINDOW

BACKGROUND

1. Field of the Disclosure

The disclosure refers to a sniffer leak detector comprising a detector with a quartz window, and in particular a sniffer leak detector that can do with a relatively simple detection means for the tracer gas.

2. Discussion of the Background Art

For leak testing containers and pipe systems, helium is typically used as the tracer gas, and the escape of helium is detected using mass-spectroscopic methods. For this purpose, the gas is ionized and the individual constituents of the gas or their fragments are then separated using a combination of electric and magnetic fields. After separation, the helium ions are detected using a detector and the signal is subsequently amplified and evaluated. Helium may also be detected by gas chromatographic methods, where, however, the detection sensitivity is lower.

During sniffer leak detection, a constant defined volume of gas is drawn through a sniffer conduit. Depending on the gas throughput through the sniffer conduit and the leakage rate of a helium leak (in leak tests, test specimens are filled with helium and closed), a certain tracer gas concentration occurs in the sniffed gas flow. A small portion of this sniffed gas mixture is introduced into the detection system (mass spectrometer) via a flow divider. For a successful separation of masses in the analyser unit, the pressure in the standard detection system must not exceed several $1 \times 10^{-4}$ mbar. Thus, the helium partial pressure to be detected is merely $10^{-10}$ mbar for a helium concentration of 1 ppm.

Generating a total pressure on the order of $1 \times 10^{-4}$ mbar requires the use of a turbomolecular pump. The use of such a pump is expensive and increases the susceptance to failure and the maintenance effort of the system. It is desirable to allow for the detection of a tracer gas under atmospheric conditions so that the turbo molecular pump and the flow divider can be omitted.

U.S. Pat. No. 6,277,177 B1 (Leybold Vakuum GmbH) and DE 100 31 882 A1 (Leybold Vakuum GmbH) describe detectors for helium or hydrogen that comprise a quartz window membrane closing a vacuum-tight housing. The quartz window membrane forms a selective passage for the gas to be detected. The tracer gas detector arranged in the housing is a gas pressure sensor reacting to the total pressure of the gas having entered the housing. Since the quartz membrane is gas selective, the gas pressure detector determines the pressure of the tracer gas in the housing. The pressure sensor arranged in the housing preferably is a Penning pressure sensor having two mutually spaced parallel cathode plates and an anode ring provided between the cathode plates. The electric circuit including the cathode plates and the anode ring includes a current measuring device for measuring the cathode or anode current. A magnetic field is generated by a permanent magnet situated outside the closed housing. Such a Penning detector has the advantage that it is much simpler and more economic than a sniffer leak detector comprising a mass spectrometer. In quartz window technology, the entire gas flow is directed past the detector. Also during operation, the pressure at the sensor may correspond to atmospheric pressure. Thus, the helium partial pressure is $10^{-3}$ mbar for a He concentration of 1 ppm, i.e. it is seven orders of magnitude higher than the pressure of the standard method. Separating helium and other gases is effected by means of a thin quartz membrane exclusively allowing helium to get into the detection volume.

It is the object of the disclosure to provide a sniffer leak detector that is of a simple and economic structure and has a high sensitivity.

SUMMARY OF THE DISCLOSURE

It is a sniffer leak detector comprising a quartz window selectively permeable to a tracer gas. The gas to be analyzed is supplied to the quartz window via a sniffer probe. The gas is passed through a suction chamber delimited by the quartz window such that it flows along the quartz window.

A quartz window sensor has the advantage of being operable at a pressure of several 100 mbar. In contrast to the "single-spot" gas inlet in the shape of the flow divider of a mass spectrometer system, the gas inlet of a quartz window detector is distributed over the entire surface of the quartz window covering an area of several square centimeters. The effect of the suction chamber is that the tracer gas supplied at a single spot by the sniffer conduit spreads out uniformly in front of the quartz window before being sucked away by the vacuum pump. Due to the low partial pressure of the tracer gas inside the quartz window detector, a portion of the tracer gas permeates through the quartz membrane into the housing despite the effect of the vacuum pump. By the tracer gas flow being distributed uniformly in front of the quartz window, a high responsiveness is achieved.

According to a preferred embodiment, the suction chamber includes a gas guidance plate that defines a gas guidance chamber together with the quartz window, the sniffer conduit terminating in the gas guidance chamber. The gas guidance chamber is substantially narrower than the suction chamber. It defines the volume formed in front of the quartz window. The response time of the sniffer leak detector is essentially determined by the volume of gas that has to be exchanged in front of the sensor. The time $\tau$ required to exchange the gas volume in front of the detector membrane can be calculated as follows:

$$\tau = \frac{pV}{q_{pV}}$$

p: pressure in front of the membrane; V: volume in front of the membrane; $q_{pV}$: flow.

The volume V of the gas guidance chamber is thus reduced by the gas guidance plate, whereby the response time is also reduced. On the other hand, the gas pressure p in front of the gas membrane can be chosen rather high, at several 100 mbar, to achieve a high sensitivity, since the volume has been made correspondingly small so that an overall exchange time clearly below 100 ms is obtained. The gas sniffed is guided along the gas guidance chamber past the quartz membrane. The cross section is dimensioned in view of a minimum volume and a sufficient flow conductance of the gas guidance chamber. It has to be sufficiently large for an unimpeded gas flow. After the gas has flown along the quartz membrane, it enters the suction chamber connected to the vacuum pump to be pumped away at a defined pumping speed.

The disclosure further refers to a protection of the sniffer leak detector against contamination. Following the presence of helium, a quartz window helium detector shows a signal decay occurring in two stages. There is a fast decay of the signal corresponding to the vacuum time constant of the sensor and a slow decay of the shifted offset current. If the sniffer leak detector is used to sniff air heavily charged with helium, a contamination of the sensor results in a shift of the offset. The degree of the shift depends on the amount of helium additionally taken in by the sensor. A shift in the offset has to be avoided for an exact and fast leak detection. This is achieved by lowering the total pressure in front of the detector membrane when a predetermined signal threshold is exceeded. To achieve this, a suction conduit from the vacuum pump to the suction chamber can be bridged by a non-throttled bypass conduit including a valve. The bypass conduit can be opened momentarily to increase the pumping speed at which the volume in front of the quartz membrane is pumped. Thereby, the total pressure, and thus the helium partial pressure in front of the detector membrane, is lowered. Thus, the amount of helium getting into the detector is reduced.

Upon exceeding an even higher signal threshold, a venting valve may be opened whereby the gas in front of the quartz membrane is replaced by air. In the meantime, the gas in the sniffer conduit heavily charged with tracer gas is supplied directly to the vacuum pump.

During its service life, the quartz window detector can take up only a limited amount of helium. In its natural state, air has a helium content of 5 ppm, so that the detector permanently takes up helium from the atmosphere during operation. The portion the detector takes up in the standby mode has to be reduced. To guarantee a quick restart with a high accuracy of measurement after a standby mode operation, however, the temperature profile on the detector membrane has to be maintained. During the standby mode, the pressure in front of the quartz membrane is reduced. The cooling efficiency at the heated detector membrane substantially depends on the gas flow (not the pressure) in front of the membrane. Lowering the pressure has only little effect on the flow so that the temperature profile on the detector membrane is maintained in the standby mode. Alternatively, in the stand-by mode, the gas flow may be sucked through an appropriate throttle instead of the sniffer conduit. This is advantageous in that the particle filter in the tip of the sniffer conduit is protected.

According to a preferred embodiment of the disclosure, a "gross leak simulation" mode can be run at certain intervals. Here, the operator trains the system for a fast signal decay. To do so, the sniffer leak detector sniffs at a location with a large helium leakage rate, e.g. $10^{-3}$ mbar l/s, so that the system can "learn" again to decay quickly to the initial level after large amounts of helium. Generally, the test leak incorporated in a standard leak detector has a leakage rate of only $10^{-5}$ mbar l/s. To simulate a high leakage rate, the pumping speed of the vacuum pump is reduced by means of a throttle such that the flow through the sniffer conduit decreases approx. by a factor of 100. Thus, the helium concentration increases by the same factor when sniffing at the built-in test leak. The system associates a correspondingly higher leakage rate to the increased concentration. In this manner, a leak of $10^{-3}$ mbar l/s is simulated using a test leak of $10^{-5}$ mbar l/s.

BRIEF DESCRIPTION OF THE DRAWINGS

The following is a detailed description of embodiments of the disclosure with reference to the drawings.

DETAILED DESCRIPTION OF THE PREFERRED EMBODIMENT

Figure 1:
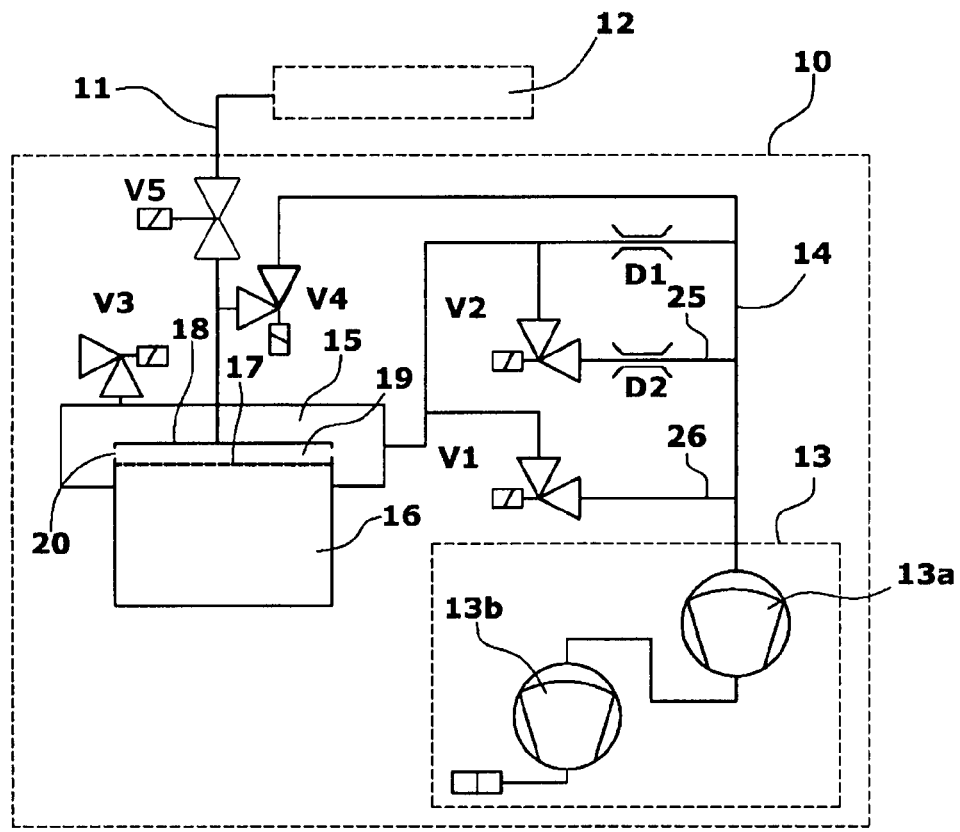
FIG. 1 is a block diagram of a first embodiment of the sniffer leak detector according to the disclosure.

With reference to FIG. 1, a basic device 10 is provided that is connected to a sniffer probe 12 via a flexible sniffer conduit 11. The sniffer probe 12 can be guided manually to search the test object for leaks from which tracer gas escapes.

The basic device 10 includes a vacuum pump 13 which, in the present embodiment, is a two-stage pump with the pump stages 13a and 13b designed as diaphragm pumps. The vacuum pump generates a vacuum of about 50 mbar.

A suction conduit 14 leads from the vacuum pump 13 to the suction chamber 15. The suction chamber 15 is formed in front of the quartz window detector 16. The walls of the suction chamber 15 adjoin the housing of the quartz window detector 16. The quartz window 17 of the quartz window detector 16 is enclosed by the suction chamber 15. A gas guidance plate 18 is provided in the suction chamber 15, which plate is arranged at a distance opposite and in parallel to the quartz window 17. The quartz window 17 and the gas guidance plate 18 delimit the gas guidance chamber 19. The sniffer conduit 11 terminates in the gas guidance chamber 19. The same has lateral exit openings 20 through which the gas can enter the suction chamber 15. The gas guidance chamber 19 causes a distribution of the gas in front of the quart window 17.

The quartz window detector 16 is designed similar to the detector described in DE 100 31 882 A1. The quartz window 17 is formed by a membrane selectively permeable to helium. Moreover, the quartz window detector 16 includes a Penning pressure sensor or another pressure sensor generating an electric signal indicating the pressure in the housing sealed by the quartz membrane. The signal for the detected amount of tracer gas is derived from this pressure.

Between the vacuum pump 13 and the suction chamber 15, the suction conduit 14 includes a first throttle D1 determining the pumping speed for the "normal" mode. The first throttle D1 is shunted by a shunt conduit 25 including a second throttle D2 and a valve V2 in series therewith. Further, the throttle D1 is bridged by a bypass conduit 26 including a valve V1.

The suction chamber 15 is adapted to be connected to ambient air through a venting valve V3.

A contamination protection valve V4 connects the sniffer conduit 11 to the suction inlet of the vacuum pump 13 without throttling.

The suction conduit 11 includes an additional valve V5 situated immediately in front of the valve V4 in the gas flow. The valve V5 is a magnetic valve used to stop the flow during the standby mode and thus enabling to lower the pressure in front of the detector membrane of the quartz window detector 16 to the base pressure of the vacuum pumps.

The following table 1 indicates the different modes "Normal", "Standby", "Contamination protection" and "Gross leak simulation" together with the corresponding positions of the valves V1, V2, V3 and V4. The table further indicates which element determines the pumping speed of the pumping device.

TABLE 1

| Mode | V1 | V2 | V3 | V4 | Pumping speed determined by |
|---|---|---|---|---|---|
| Normal | Closed | Open | Closed | Closed | Throttle 2 |
| Standby | Open | Open | Open | Closed | Throttle 3 |
| Contamination Protection | Open | Open | Open (momentarily) | Open | Pump |
| Gross leak simulation | Closed | Closed | Closed | Closed | Throttle 1 |

Figure 2:
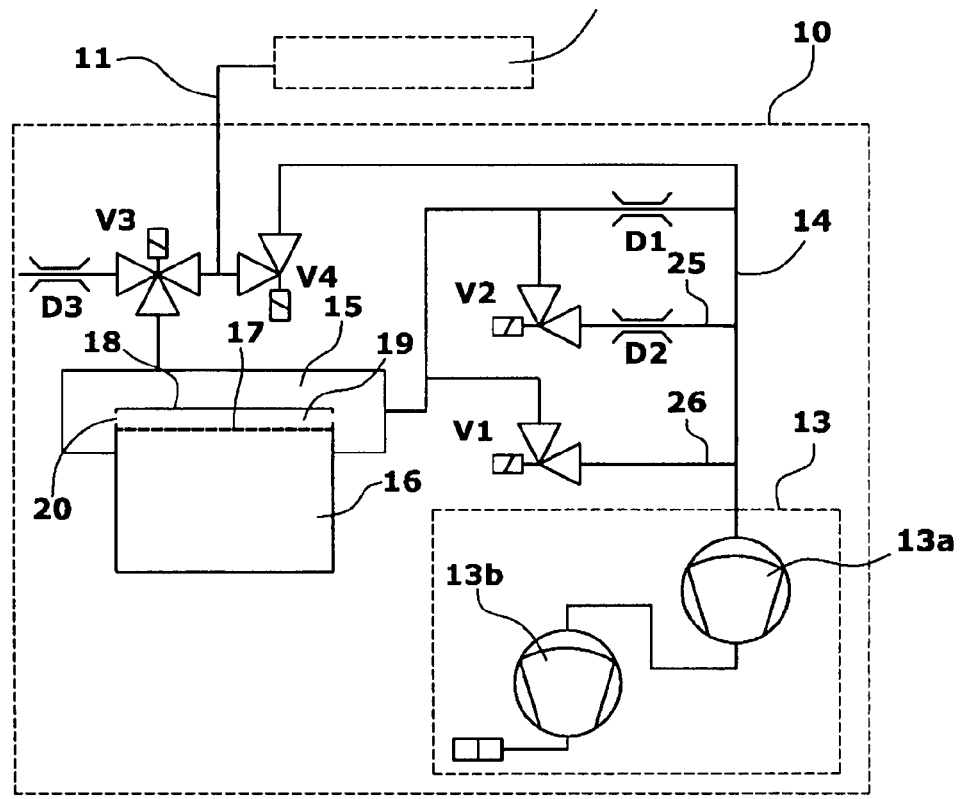
FIG. 2 is a block diagram of a second embodiment of the sniffer leak detector.

The embodiment of FIG. 2 differs from that of FIG. 1 in that the venting valve is situated in the sniffer conduit 11, thereby venting the gas guidance chamber 19. The venting valve V3 has a throttle D3 provided at its inlet to restrict the venting flow. Also in this embodiment, the contamination protection valve V4 is situated between the sniffer conduit 11 and the vacuum pump 13.

The operation modes of the embodiment of FIG. 2 are given in Table 2 below.

TABLE 2

| Mode | V1 | V2 | V3 | V4 | Pumping speed determined by |
|---|---|---|---|---|---|
| Normal | Closed | Open | Closed | Closed | Throttle 2 |
| Standby | Open | Open | closed | Closed | Pump |
| Contamination Protection | Open | Open | Open (momentarily) | Open | Pump |
| Gross leak simulation | Closed | Closed | Closed | Closed | Throttle 1 |

The two variants shown only differ in their operation in the standby mode.

In the first embodiment, the gas flow is still passing through the sniffer conduit 11 during standby. Since the sniffed gas passes no valve on its way from the sniffer probe 12 to the quartz window detector 16, the system has a short response.

In the embodiment of FIG. 2, the gas flow is guided through the throttle D3. The flow conductance of the throttle D3 is chosen to be the same as the flow conductance of the sniffer conduit 11. Thus, it is guaranteed that the gas flow at the detector window 17 during standby mode is unchanged compared to normal operation. Moreover, during standby operation in this variant a particle filter provided in the sniffer conduit 11 is preserved.

What is claimed is:

1. A sniffer leak detector with a quartz window detector, comprising a sniffer probe connected to the quartz window detector via a sniffer conduit, a vacuum pump, and a suction chamber situated in front of the quartz window of the quartz window detector and connected to the vacuum pump, wherein a suction conduit leading from the vacuum pump to the suction chamber includes a first throttle, and wherein the first throttle can be bridged by a non-throttled bypass conduit including a valve.

2. The sniffer leak detector of claim 1, wherein the suction chamber includes a gas guidance plate defining a gas guidance chamber together with the quartz window, and wherein the sniffer conduit terminates in the gas guidance chamber.

3. A sniffer leak detector with a quartz window detector, comprising a sniffer probe connected to the quartz window detector via a sniffer conduit, a vacuum pump, and a suction chamber situated in front of the quartz window of the quartz window detector and connected to the vacuum pump, wherein a suction conduit leading from the vacuum pump to the suction chamber includes a first throttle, and wherein the first throttle can be bridged by means of a shunt conduit including second throttle and a valve.

4. A sniffer leak detector with a quartz window detector, comprising a sniffer probe connected to the quartz window detector via a sniffer conduit, a vacuum pump, and a suction chamber situated in front of the quartz window of the quartz window detector and connected to the vacuum pump, wherein, as a protection against a contamination of the quartz window detector, the sniffer conduit may be connected to the vacuum pump via a contamination protection valve without throttling.

5. The sniffer leak detector of claim 1, wherein the suction chamber is provided with a venting valve.

6. The sniffer leak detector of claim 5, wherein the venting valve is connected to the sniffer conduit in series with a throttle.

7. The sniffer leak detector of claim 1, further comprising a normal mode in which the bypass conduit is closed and the shunt conduit is open.

8. The sniffer leak detector of claim 1, further comprising a standby mode in which the bypass conduit is open and the shunt conduit is open.

9. The sniffer leak detector of claim 1, further comprising a contamination protection mode in which the bypass conduit and the shunt conduit are open and the venting valve is opened temporarily and the contamination protection valve is open.

10. The sniffer leak detector of claim 1, further comprising a gross leak simulation mode in which the bypass conduit, the shunt conduit and the venting valve are closed.

11. The sniffer leak detector of claim 3, wherein the suction chamber includes a gas guidance plate defining a gas guidance chamber together with the quartz window, and wherein the sniffer conduit terminates in the gas guidance chamber.

12. The sniffer leak detector of claim 3, wherein the suction chamber is provided with a venting valve.

13. The sniffer leak detector of claim 12, wherein the venting valve is connected to the sniffer conduit in series with a throttle.

14. The sniffer leak detector of claim 4, wherein the suction chamber includes a gas guidance plate defining a gas guidance chamber together with the quartz window, and wherein the sniffer conduit terminates in the gas guidance chamber.

15. The sniffer leak detector of claim 4, wherein the suction chamber is provided with a venting valve.

16. The sniffer leak detector of claim 15, wherein the venting valve is connected to the sniffer conduit in series with a throttle.

* * * * *